July 25, 1950  J. KLEIN  2,516,468
FISHING PLUG
Filed Dec. 5, 1946
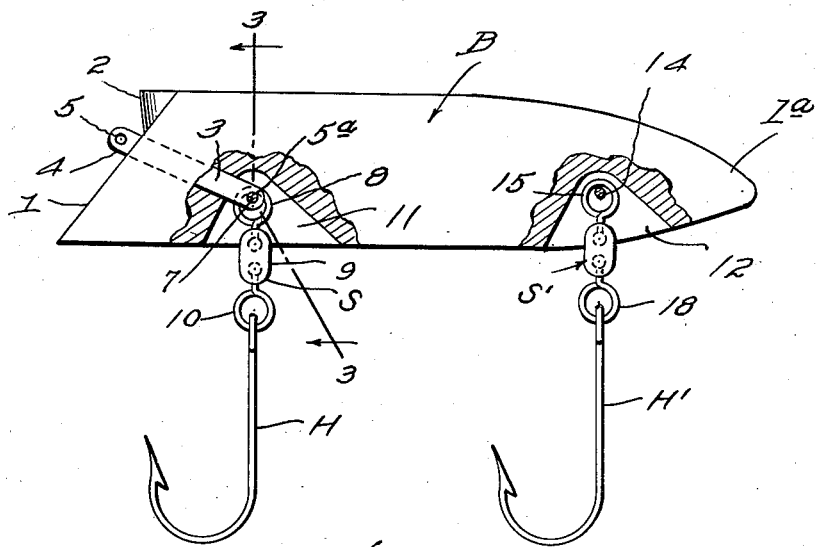
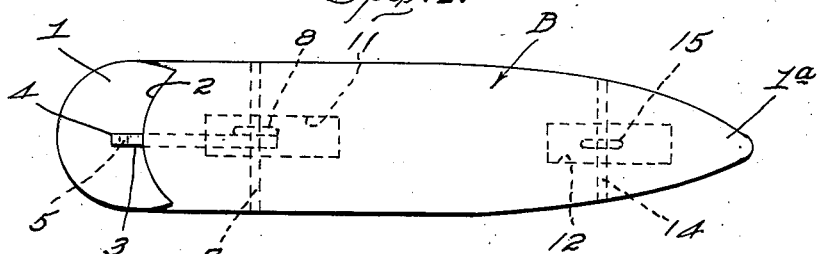
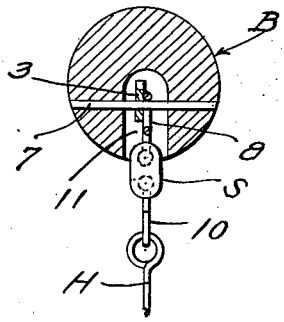
Inventor
Joseph Klein
By Wilfred E. Lawson
Attorney Patented July 25, 1950

2,516,468

UNITED STATES PATENT OFFICE 2,516,468

FISHING PLUG

Joseph Klein, Arlington, Wash.

Application December 5, 1946, Serial No. 714,170

1 Claim. (Cl. 43—42.08)

This invention relates to a fishing plug and it is primarily an object of the invention to provide artificial bait of this kind especially designed and adapted for use in connection with the fishing for salmon or kindred fish.

It is also an object of the invention to provide a plug of this kind constructed in a manner which permits the use of relatively large or heavy single hooks whereby after a strike, it is not necessary to reel up and reset hooks.

The invention consists in the details of construction and in the combination and arrangement of the several parts of my improved fishing plug, whereby certain advantages are attained, as will be hereinafter more fully set forth.

In order that my invention may be better understood, I will now proceed to describe the same with reference to the accompanying drawing, wherein:

Figure 1 is a view partly in section and partly in side elevation with portions in section of a plug constructed in accordance with an embodiment of the invention; and Figure 2 is a view in top plan of the device as illustrated in Figure 1.

Figure 3 is a sectional view taken substantially on the line 3—3 of Figure 1.

As disclosed in the accompanying drawing, the plug comprises an elongated body member B which has a uniformly tapering rear end or tail portion 1a.

The front end of the body B is provided with a downwardly and forwardly inclined flat face 1 which extends from the bottom of the body B to a point closely adjacent to the top, whereby the upper portion of the body B at its front and directly above the face 1 has a forwardly facing shoulder 2. As illustrated in Figure 1 of the drawing, this shoulder 2 is forwardly bowed.

Inserted into the body B from a point centrally of and adjacent to the shoulder 2 is an elongated rigid member or bar 3. The upper end of this member or bar 3 extends slightly beyond the face 1 as at 4 and said portion 4 is provided with an opening 5 therethrough whereby a fishing line may be readily attached. It is to be noted that the end portion 4 of this member or bar 3 does not extend above the shoulder 2 so that in the travel of the plug through the water, it will offer no material handicap or hindrance.

The member or bar 3 extends into the body B at approximately right angles to the face 1 and is of a length to terminate a distance inwardly of the bottom of the body B and within a substantially triangular recess or slot 11 opening through the bottom side of the body. The end of the bar 3 within the recess or slot 11 is apertured as shown at 5a, in Figure 1, to receive a pin 7 transversely through the body B and the aperture, and to have that portion of the pin passing through and adjacent to the bar engaged by the eye or ring 8 at the inner end of a swivel S.

The swivel S includes an intermediate element 9 which depends outwardly of the recess or slot 11 and has a second eye or ring 10 at its outer end for the attachment of a hook H thereto. This hook H is relatively heavy and of a single type which is particularly advantageous in connection with a plug of this kind which is primarily intended for use in fishing for salmon or kindred fish.

In close proximity to the tail end of the body B the undersurface thereof is provided with a second recess or slot 12, substantially identical in form to that of the recess or slot 11, having its upper portion intersected by a pin 14 extending transversely through the body B and through the inner eye or ring 15 forming part of a second swivel S'. This second swivel S' includes an intermediate member 16 and an outer second eye or ring 18 which depends outwardly of the recess or slot 12 for the attachment of a second relatively heavy hook H' which is, together with the hook H, of considerable size.

It has been found in practice that a plug type of line for use in the fishing for salmon or the like is of particular advantage when the body thereof is provided only with two hooks, one at the forward portion and the other aft thereof. The efficiency of the plug is further increased by having the hook members H and H' in swivel connection below the body but suspended entirely therebelow so as to have free swinging and turning movement to accommodate for the action at the time of strike.

By having the hooks H and H' relatively heavy, they will not be straightened out by big fish and also the plug will not have to be reeled up and reset after a strike.

While the body B may be of wood or other material desired, yet it has been found preferable to make the same of plastic as by using plastic, liability is avoided of the body becoming waterlogged and particularly at deep fishing.

From the foregoing description it is thought to be obvious that a fishing plug constructed in accordance with my invention is particularly well adapted for use by reason of the convenience and facility with which it may be assembled and operated.

I claim:

A fishing plug comprising an elongated body having a tapering rear end portion, said body also having its forward end formed with a flat downwardly and forwardly sloping surface and its bottom side with a pair of longitudinally spaced, substantially triangular recesses, a bar extending inwardly of the center of the upper side of said surface and having its rearwardly directed end projecting into the forward one of said recesses, the forward end of said bar being apertured for the attachment of a fishing line thereto and its opposite end being provided with an opening, a pin extending transversely through said body and the said opening to secure said bar in place, a swivel having end eyes, one of said eyes being engaged on said pin and its other end eye equipped with a fishing hook, a second pin extending transversely through said body and through the rear one of said recesses, and a second swivel having end eyes, one of said latter eyes being engaged on said second pin within said rear recess and the other end eye of the last named swivel being equipped with a fishing hook.

JOSEPH KLEIN.

REFERENCES CITED

The following references are of record in the file of this patent:

UNITED STATES PATENTS

| Number | Name | Date |
|---|---|---|
| 1,744,366 | Davenport | Jan. 21, 1930 |
| 2,102,492 | Stolley | Dec. 14, 1937 |
| 2,198,043 | Scogland et al. | Apr. 23, 1940 |
| 2,239,404 | Slepica | Apr. 22, 1941 |
| 2,389,883 | Worden | Nov. 27, 1945 |